(12) United States Patent
Mouaddib et al.

(10) Patent No.: US 12,510,870 B2
(45) Date of Patent: Dec. 30, 2025

(54) SYSTEMS AND METHODS FOR GENERATION OF ACTION STRATEGIES BY AN AUTONOMOUS SYSTEM

(71) Applicants: UNIVERSITÉ DE CAEN NORMANDIE, Caen (FR); CENTRE NATIONAL DE LA RECHERCHE SCIENTIFIQUE (CNRS), Paris (FR); ECOLE NATIONALE SUPÉRIEURE D'INGÉNIEURS DE CAEN, Caen (FR)

(72) Inventors: Abdel-Ilah Mouaddib, Caen (FR); Laurent Jeanpierre, Épron (FR)

(73) Assignees: UNIVERSITÉ DE CAEN NORMANDIE, Caen (FR); CENTRE NATIONAL DE LA RECHERCHE SCIENTIFIQUE, Paris (FR); ECOLE NATIONALE SUPÉRIEURE D'INGÉNIEURS DE CAEN, Caen (FR)

( * ) Notice: Subject to any disclaimer, the term of this patent is extended or adjusted under 35 U.S.C. 154(b) by 406 days.

(21) Appl. No.: 18/101,757

(22) Filed: Jan. 26, 2023

(65) Prior Publication Data

US 2023/0168642 A1 Jun. 1, 2023

Related U.S. Application Data

(63) Continuation of application No. PCT/IB2022/056022, filed on Jun. 28, 2022.

(30) Foreign Application Priority Data

Jun. 29, 2021 (EP) ..................................... 21305893
Jun. 29, 2021 (EP) ..................................... 21305894

(Continued)

(51) Int. Cl.
*G05B 13/04* (2006.01)
*B60W 60/00* (2020.01)
(Continued)

(52) U.S. Cl.
CPC ....... *G05B 13/045* (2013.01); *B60W 60/0016* (2020.02); *G05D 1/229* (2024.01);
(Continued)

(58) Field of Classification Search
CPC ............ G05B 13/045; B60W 60/0016; B60W 2556/40; G05D 1/229; G05D 1/656; G06F 9/4881; G06N 5/025
(Continued)

(56) References Cited

U.S. PATENT DOCUMENTS 6,122,572 A 9/2000 Yavnai
2011/0184604 A1 7/2011 Franke et al.
(Continued)

FOREIGN PATENT DOCUMENTS

CN 106447028 A1 2/2017
CN 109129467 A 1/2019
(Continued)

OTHER PUBLICATIONS

Certificate of Correction with regard to the U.S. Pat. No. 6122572 signed Oct. 9, 2001.
(Continued)

*Primary Examiner* — Jigneshkumar C Patel
(74) *Attorney, Agent, or Firm* — BCF LLP

(57) ABSTRACT

Systems and methods for generating an action strategy to be executed by an autonomous system are disclosed. The action strategy comprises a series of actions to be performed by the autonomous system to accomplish a corresponding active objective in response to detecting an abnormal event, the abnormal events occurring or having occurred in an envi-
(Continued)

ronment where the autonomous system is configured to operate. The method comprises accessing a first database populated with event descriptions corresponding to abnormal events and accessing a second database populated with candidate objectives. Each candidate objective defines a task accomplishable by the autonomous system and comprises an activation condition and a progressive task unit structure describing a hierarchy of actions to be performed in order to accomplish the corresponding candidate objective. An execution of a candidate objective generating an action strategy from the progressive task unit structure of the active objective and executing the action strategy.

20 Claims, 8 Drawing Sheets

(30) Foreign Application Priority Data

Jun. 29, 2021 (EP) .................................. 21305895
Jun. 29, 2021 (EP) .................................. 21305896

(51) Int. Cl.
  *G05D 1/229* (2024.01)
  *G05D 1/656* (2024.01)
  *G06F 9/48* (2006.01)
  *G06N 5/025* (2023.01)

(52) U.S. Cl.
  CPC ........... *G05D 1/656* (2024.01); *G06F 9/4881* (2013.01); *G06N 5/025* (2013.01); *B60W 2556/40* (2020.02)

(58) Field of Classification Search
  USPC .......................................................... 700/31
  See application file for complete search history.

(56) References Cited

U.S. PATENT DOCUMENTS

| | | | |
|---|---|---|---|
| 2013/0080360 | A1 | 3/2013 | Sterritt et al. |
| 2017/0357263 | A1 | 12/2017 | Glatfelter et al. |
| 2019/0051061 | A1* | 2/2019 | Battles ................. G05D 1/0088 |
| 2019/0318265 | A1* | 10/2019 | Gould ...................... G06F 8/65 |
| 2019/0384292 | A1* | 12/2019 | Aragon ................ B60W 50/04 |
| 2020/0009736 | A1 | 1/2020 | Pinter et al. |
| 2021/0122373 | A1 | 4/2021 | Dax |
| 2021/0173700 | A1 | 6/2021 | Saunders |

FOREIGN PATENT DOCUMENTS

| | | | |
|---|---|---|---|
| CN | 110285813 | A | 9/2019 |
| CN | 110614642 | A | 12/2019 |
| EP | 3333762 | A1 | 6/2018 |
| EP | 3590664 | A1 | 1/2020 |
| JP | 2015066625 | A | 4/2015 |
| KR | 20170114614 | A | 10/2017 |
| KR | 20190134554 | A | 12/2019 |
| WO | 200708341 | A2 | 1/2007 |
| WO | 200708347 | A2 | 1/2007 |
| WO | 2014137767 | A2 | 9/2014 |
| WO | 201614774 | A1 | 1/2016 |
| WO | 2019114145 | A1 | 6/2019 |

OTHER PUBLICATIONS

International Search Report and Written Opinion with regard to PCT/IB2022/056022 mailed Oct. 17, 2022.
International Search Report and Written Opinion with regard to PCT/IB2022/056018 mailed Sep. 15, 2022.
Truong et al., "Toward Socially Aware Robot Navigation in Dynamic and Crowded Environments: a Proactive Social Motion Model", IEEE Transactions on Automation Science and Engineering, vol. 14, No. 4, Oct. 2017, pp. 1743-1760.
Truong et al., ""To Approach Humans?": A Unified Framework for Approaching Pose Prediction and Socially Aware Robot Navigation", IEEE Transactions on Cognitive and Developmental Systems, vol. 10, No. 3, Sep. 2018, pp. 557-572.
International Search Report and Written Opinion with regard to PCT/IB2022/056021 mailed Nov. 2, 2022.
Cebulla, "Knowlege-based Assessment of Behavior in Dynamic Environments", KRAS'05, Nov. 5, 2005, Germany, pp. 17-26.
Javaid et al., "Knowledge-based Robotic Agent as a Game Player", School of Information and Communication Technology, Pricai 2019, Australia, pp. 322-336.
Wong, "Coping with Conflict in Cooperative Knowledge-based Systems", IEEE Transactions on Systems, Man, and Cybernetics—Part A: Systems and Humans, vol. 27, No. 1, Jan. 1997, pp. 57-72.
International Search Report and Written Opinion with regard to PCT/IB2022/056023 mailed Oct. 28, 2022.
English Abstract for CN106447028 retrieved on Espacenet on Dec. 19, 2022.
Extended European Search Report with regard to EP21305893.6 completed Nov. 24, 2021.
Kastner et al., "Connecting Deep-Reinforcement-Learning-based Obstacle Avoidance with Conventional Global Planners using Waypoint Generators", Arxiv.org, Cornell University Library, 201 Olin Library Cornell University Ithaca, NY 14853, Apr. 2021, 8 pages.
"The More-Than-One Robotics Laboratory: Real experiment 1: Towards Socially Aware Robot Navigation in Crowded and Dynamic Environments", Aug. 2016, retrieved from the Internet: URL:https://www.youtube.com/watch?v=vl6ovom97GO, pdf 2 pages.
Chen et al., "Mobile robot path planning based on social interaction space in social environment", International Journal of Advanced Robotic Systems, vol. 15, No. 3, May 2018, pp. 1-10.
Truong et al., "Dynamic Social Zone based Mobile Robot Navigation for Human Comfortable Safety in Social Environments", International Journal of Social Robotics, Springer Netherlands, Dordrecht, vol. 8, No. 5, May 2016, pp. 663-684.
Extended European Search Report with regard to EP21305894.4 completed Dec. 10, 2021.
Extended European Search Report with regard to EP21305895.1 completed Dec. 11, 2021.
Extended European Search Report with regard to EP21305896.9 completed Dec. 20, 2021.
"The More-Than-One Robotics Laboratory: Real experiment 2: Towards Socially Aware Robot Navigation in Crowded and Dynamic Environments", Aug. 2016, retrieved from the Internet: URL:https://www.youtube.com/watch?v=1yK2vLSeaHE, pdf 2 pages.
English Abstract for CN110614642 retrieved on Espacenet on Dec. 20, 2022.
English Abstract for KR20190134554 retrieved on Espacenet on Dec. 20, 2022.
English Abstract for CN110285813 retrieved on Espacenet on Dec. 20, 2022.
English Abstract for CN109129467 retrieved on Espacenet on Dec. 20, 2022.
English Abstract for KR20170114614 retrieved on Espacenet on Dec. 20, 2022.
English Abstract for JP2015066625 retrieved on Espacenet on Dec. 20, 2022.
Bellarbi et al., "Dynamic proxemia modeling formal framework of social navigation and interaction", ResearchGate, Jan. 2021, 20 pages.
Iocchi et al., "A Practical Framework for Robust Decision-Theoretic Planning and Execution for Service Robots", Twenty-Sixth International Conference on Automated Planning and Scheduling, vol. 26, 2016, 9 pages.

* cited by examiner

| Module (name) | Module (name) | Execution Condition | Probability | Successor |
|---|---|---|---|---|
| $m_0^1$ (Wait) | $\alpha_0^1$ | Personn | 1 | $m_1^1$ |
| $m_1^1$ (Ask) | $\alpha_1^1$ | A | 0.4 | $m_2^1, m_2^2$ |
| $m_1^1$ (Ask) | $\beta_1^1$ | B | 0.4 | $m_2^3, m_2^4$ |
| $m_1^1$ (Ask) | $\gamma_0^1$ | none | 0.2 | $m_4^1$ |
| $m_2^1$ (TaskA1) | $\alpha_2^1$ | | 1 | $m_4^1$ |
| $m_2^2$ (TaskA2) | $\alpha_2^2$ | | 1 | $m_4^1$ |
| $m_2^3$ (TaskB1) | $\alpha_2^3$ | | 1 | $m_4^1$ |
| $m_2^4$ (TaskB2) | $\alpha_2^4$ | | 1 | $m_4^1$ |
| $m_3^1$ (Bye) | $\alpha_3^1$ | | 1 | $m_4^1$ |

700

710

| State s | Action a | Successor states SS |
|---|---|---|
| $s_0^0$ | Wait | $\{(s_1^1, \text{person})\}$ |
| $s_1^1$ | Ask | $\{(s_2^1, A), (s_2^2, B), (s_2^3, \text{none})\}$ |
| $s_2^1$ | TaskA | $\{(s_3^1, \text{True})\}$ |
| $s_2^2$ | TaskB | $\{(s_3^2, \text{True})\}$ |
| $s_2^3$ | Bye | $\{(s_4^1, \text{True})\}$ |
| $s_3^1$ | Bye | $\{(s_4^1, \text{True})\}$ |
| $s_3^2$ | Bye | $\{(s_4^1, \text{True})\}$ |
| $s_4^1$ | Bye | $\{(s_4^1, \neg\alpha_3^1.\psi), (f_1, \alpha_3^1.\psi)\}$ |

720

| State s | Action a | Successor states SS |
|---|---|---|
| $f_1$ | Recover1 (go welcome point) | $\{(s_0^0, \text{True})\}$ |

Figure 7

SYSTEMS AND METHODS FOR GENERATION OF ACTION STRATEGIES BY AN AUTONOMOUS SYSTEM

CROSS-REFERENCE TO RELATED APPLICATIONS

The present patent application is a continuation of International Patent Application No. PCT/IB2022/056022, filed Jun. 28, 2022, which claims priority from European Patent Application Number 21305893.6 filed on Jun. 29, 2021, European Patent Application Number 21305894.4 filed on Jun. 29, 2021, European Patent Application Number 21305895.1 filed on Jun. 29, 2021 and European Patent Application Number 21305896.9 filed on Jun. 29, 2021, each of which is incorporated herein by reference in its entirety.

FIELD OF THE TECHNOLOGY

The present technology relates to systems and methods for generation of action strategies and, more particularly, to intelligent autonomous systems interacting within their environment.

BACKGROUND

Recent developments in autonomous decision-making processes has been a major step in developing autonomous systems. Potential applications cover a wide range of domains such as, but not limited to, assistive humanoid robotic systems, or network flow monitoring and managing systems. Autonomous systems are expected to perform tasks to satisfy a user, an interacting human, or any object requiring assistance while abiding by predefined and/or changing rules. Such autonomous systems developed for handling various activities include one or more data processing and decision-making units, which are used to process data and generate optimal action strategies.

Even though the recent developments identified above may provide benefits, improvements are still desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In particular, such shortcomings may comprise (1) inability of reacting when facing an unexpected event; (2) long computation time for establishing an action strategy resulting in potential interruptions while operating in a given environment; and/or (3) unsuitability of static strategies of actions in a dynamic environment.

In a first aspect, various implementations of the present technology provide a method for generating an action strategy to be executed by an autonomous system, the action strategy comprising a series of actions to be performed by the autonomous system to accomplish a corresponding active objective in response to detecting an abnormal event, the abnormal events occurring or having occurred in an environment where the autonomous system is configured to operate, the abnormal event being identified as incoherent based on a result of a coherence checking procedure between a description of the corresponding event and properties of the environment. The method comprises accessing a first database populated with event descriptions corresponding to abnormal events detected by the autonomous system. The method comprises accessing a second database populated with candidate objectives. Each candidate objective defines a task accomplishable by the autonomous system and comprises an activation condition corresponding to one or more event descriptions, the activation condition being fulfilled if determination is made that the corresponding one or more event descriptions are found in the first database; and a progressive task unit structure describing a hierarchy of actions to be performed in order to accomplish the corresponding candidate objective, the progressive task unit structure comprising executable modules configured to be executed by the autonomous system to perform the corresponding hierarchy of actions, each executable module corresponding to an action of the hierarchy of actions. The method comprises selecting one or more candidate objectives from the second database by determining whether the activation conditions of the one or more candidate objectives are fulfilled based on the event descriptions; and executing the one or more candidate objectives. An execution of a candidate objective comprises transferring parameters of at least one of the event descriptions that caused the selection of the candidate objective to the candidate objective, thereby defining an active objective; generating an action strategy from the progressive task unit structure of the active objective, a series of actions of the action strategy corresponding to actions corresponding to the executable modules of the progressive task unit structure; and executing the series of actions of the action strategy.

In some embodiments of the method, event descriptions of the first database correspond to abnormal events detected by the autonomous system, each of the abnormal events being identified as incoherent based on a result of a coherence checking procedure between an event description of the corresponding event and properties of the environment, and wherein accessing the first database is made in response to detecting, by the autonomous system, an abnormal event.

In some embodiments of the method, the progressive task unit structures further comprise one or more sequence of processing levels, each sequence of processing levels comprising one or more of the executable modules; a set of state variables describing parameters of a state of an execution of the candidate objective; a set of observable properties, an observable property corresponding to one or more of the event descriptions of the first database; or a combination thereof.

In some embodiments of the method, each executable module of the progressive task unit structures corresponds to configuration of a sub-set of state variables of the set of state variables of the corresponding progressive task unit structure, and, if determination is made that, for a given executable module, a corresponding configuration is not fulfilled upon execution of the action corresponding to the given executable module, said action is identified as a failure of the autonomous system.

In some embodiments of the method, the progressive task unit structure of at least one of the candidate objectives further comprises a failure recovery module configured to be executed by the autonomous system to recover from a corresponding failure of the autonomous system, the corresponding failure of the autonomous system being identified based on a mismatch of the set of state variables and configurations of sub-set of state variables corresponding to the executable module of the at least one progressive task unit structure.

In some embodiment of the method, the at least one of the candidate objective further comprises one or more failure recovery progressive task unit structures comprising a hierarchy of resource-bounded actions to be performed, each failure recovery progressive task unit structure corresponding to a failure recovery module of a progressive task unit structure, execution of the failure recovery module causing an execution of the resource-bounded actions of the failure recovery progressive task unit structure by the autonomous system.

In some embodiments of the method, the executable modules are further associated with an execution score for executing corresponding executable modules, and generating the executable action strategy comprises maximizing a global execution score, the global execution score being a combination of the execution scores associated with the executable modules.

In some embodiments of the method, the execution scores of the executable modules are weighted by execution probabilities of the corresponding executable modules for determining the global execution score, an execution probability describing a probability of an execution of the corresponding executable module by the autonomous system.

In some embodiments of the method, generating the action strategy from the progressive task unit structure of the candidate objective comprises generating a stochastic decision process from the progressive task unit structure. The stochastic decision process comprises at least a set of actions corresponding to the actions of the executable modules of the progressive task unit structure; and a set of states comprising states of the autonomous system, each state corresponding to an outcome of an execution of an executable module. The method comprises executing the stochastic decision process.

In some embodiments of the method, the stochastic decision process is a factored Markov decision process.

In some embodiments of the method, one or more actions corresponding to the executable modules cause an execution of one or more candidate objectives.

In a second aspect, various implementations of the present technology provide a computer-implemented method for planning actions to be executed by an autonomous system to fulfill one or more objectives by accomplishing one or more corresponding tasks. The method comprises accessing a set of one or more objectives. Each of the one or more objectives comprises parameters identifying characteristics of the corresponding one or more objectives. The method comprises accessing a first database comprising progressive task unit structures, each progressive task unit structure comprising a hierarchy of actions to accomplish a corresponding task described by executable modules and failure recovery modules, each executable module being configured to be executed by the autonomous system to perform a resource-bounded action of the hierarchy of action. Each failure recovery module is configured to be executed by the autonomous system when determination is made that the autonomous system failed to perform an action corresponding to an executable module to pursue an accomplishment of the corresponding task. The method comprises accessing a second database comprising failure recovery progressive task unit structures comprising a hierarchy of resource-bounded actions to be performed, each failure recovery progressive task unit structure corresponding to a failure recovery module of a progressive task unit structure. An execution of the failure recovery module causes an execution of the resource-bounded actions by the autonomous system. The method comprises selecting one or more progressive task unit structures from the first database based on the parameters of the one or more objectives, each objective corresponding to a progressive task unit structure and executing the selected one or more progressive task unit structures. The execution comprises generating one or more stochastic decision processes from the selected one or more progressive task unit structures. Each stochastic decision processes comprises a set of actions corresponding to the actions of the executable modules and failure recovery modules of the progressive task unit structure; and a set of states corresponding to outcomes of the actions of the executable modules. The method comprises executing the one or more stochastic decision processes by performing one or more actions of the set of actions based on a current state of the autonomous system; and, upon executing the selected one or more progressive task unit structures, if determination is made that the autonomous system is to perform an action corresponding to a failure recovery module, executing the hierarchy of resource-bounded actions of the failure recovery progressive task unit structure of the failure recovery module.

In some embodiments of the method, executing the hierarchy of resource-bounded actions of the corresponding failure recovery progressive task unit structure comprises generating a stochastic decision process from the failure recovery progressive task unit structure. The stochastic decision process comprises a set of actions corresponding to the resource-bounded actions of the failure recovery progressive task unit structure; and a set of states corresponding to outcomes of the resource-bounded actions. The method comprises executing the stochastic decision process by performing one or more actions of the set of actions based on a current state of the autonomous system.

In some embodiments of the method, the stochastic decision process is a factored Markov decision process.

In some embodiments of the method, each executable module is associated with a sub-set of state variables describing parameters of a state of an execution of the candidate objective; and generating one or more stochastic decision processes from the selected one or more progressive task unit structures comprises selecting executables modules of the selected one or more progressive task unit structures that correspond to predetermined state variables.

In a third aspect, various implementations of the present technology provide a computer-implemented method for generating an action strategy to be executed by an autonomous system, the action strategy comprising a series of actions to be performed by the autonomous system to accomplish a corresponding active objective, the series of actions comprising one or more resource-bounded actions to be performed by the autonomous system if the autonomous system has limited resources to accomplish the active objective, the autonomous system comprising one or more sensing devices configured to sense predetermined state variables, the state variables defining a state of the autonomous system. The method comprises accessing a first database populated with event descriptions corresponding to events detected by the autonomous system, the events occurring or having occurred in an environment where the autonomous system is configured to operate, accessing a second database populated with candidate objectives. Each candidate objective defines a task accomplishable by the autonomous system and comprises an activation condition corresponding to one or more event descriptions, the activation condition being fulfilled if determination is made that the corresponding one or more event descriptions are found in the first database and a progressive task unit structure describing a hierarchy of actions to be performed in order to accomplish the corresponding candidate objective, the progressive task unit structure comprising executable modules configured to be executed by the autonomous system, each executable module corresponding to an action of the hierarchy of actions and being associated with a given state of the autonomous system, at least one progressive task unit structure comprising at least one failure recovery module corresponding to a resource-bounded action to be performed in response to a given failure state of the autonomous system being detected by the one or more sensing devices while performing an action strategy, the executable modules and failure recovery modules being associated with an execution score indicative of which modules should be preferentially executed during performance of the action strategy. The method further comprises selecting one or more candidate objectives from the second database by determining whether the activation conditions of the one or more candidate objectives are fulfilled based on the event descriptions, and executing the selected one or more candidate objectives. An execution of a candidate objective comprises transferring parameters of at least one of the event descriptions that caused the selection of the candidate objective to the selected candidate objective, thereby generating the active objective, generating an action strategy from the progressive task unit structure, the action strategy comprising information about actions to be performed according to a state of the autonomous system such that, upon detection of a failure state of the autonomous system, a corresponding resource bounded-action is executed, the series of actions of the action strategy being based on the execution scores of the executable modules and failure recovery modules and executing the series of actions of the action strategy based on the state of the autonomous system.

In a fourth aspect, various implementations of the present technology provide a system for generating an action strategy to be executed by an autonomous system, the system comprising a processor and a memory configured to store instructions which, upon being executed by the processor, cause the system to perform the methods.

In a fifth aspect, various implementations of the present technology provide a computer-readable support comprising instructions which, upon execution of the instructions, cause a computer to carry out the steps of the methods.

In the context of the present specification, unless expressly provided otherwise, a computer system may refer, but is not limited to, an "electronic device", an "operation system", a "system", a "computer-based system", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 7 is a representation of another action strategy in accordance with an embodiment of the present technology.

Figure 1:
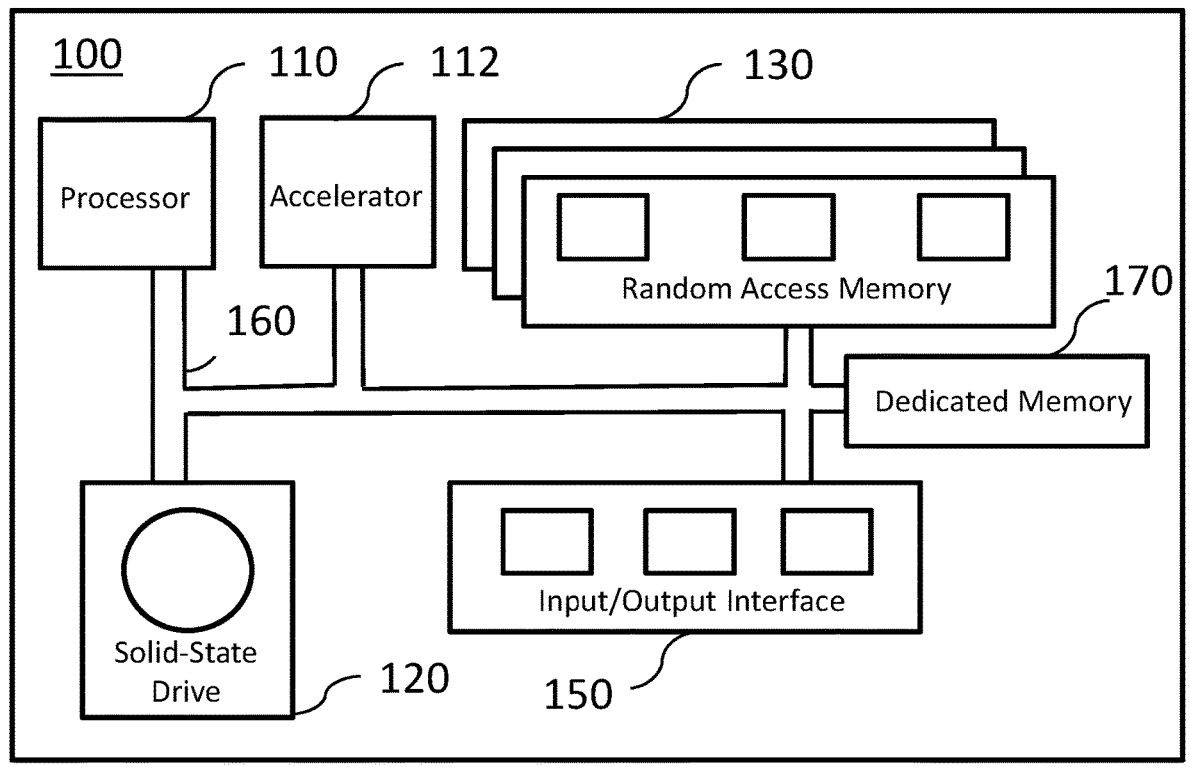
FIG. 1 is a computer system suitable for use in accordance with an embodiment of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes that may be substantially represented in non-transitory computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

The present technology provides more self-sufficiency to autonomous systems by enabling such systems to generate and execute optimal action strategies, or "action policies", based on the available resources. An action strategy may comprise a series of actions to be performed to accomplish a task, where an execution of an action may be adjusted in real-time, or close to real-time, based on executions conditions such as outcomes of other actions, available resources and/or other possible execution conditions. An action strategy may be referred to as an action plan that may be adjusted at any time. Therefore, the systems may be able to sense and interact with a surrounding environment.

Besides, the autonomous system implemented in accordance with the present technology may be able to adapt a strategy in real-time and react to unexpected events, or "abnormal" events, and/or states in order to accomplish the task in the most efficient and satisfying manner. Furthermore, the autonomous system may be able to respond to situations that arise before or during execution of a task.

Various aspects of the present disclosure generally address one or more of the problems found in conventional autonomous systems. To this end, the present disclosure, amongst other aspects, introduces intelligent autonomous system configured to generate and execute assistive action strategies.

With these fundamentals in place, we will now consider some non-limiting examples to illustrate various implementations of aspects of the present technology.

With reference to FIG. 1, there is shown a computer system 100 suitable for use in accordance with at least some embodiments of the present technology. The computer system 100 may be implemented by any of a conventional personal computer, a network device and/or an electronic device (such as, but not limited to, a mobile device, a tablet device, a server, a controller unit, a control device, etc.), and/or any combination thereof appropriate to the relevant task at hand. In some embodiments, the computer system 100 comprises various hardware components including one or more single or multi-core processors collectively represented by processor 110, a solid-state drive 120, a random-access memory 130, and an input/output interface 150. The computer system 100 may be a computer specifically designed to operate a machine learning algorithm (MLA). The computer system 100 may be a generic computer system. The computer system 100 may be integrated in a robotic vehicle and/or may be configured to control a robotic vehicle.

In some embodiments, the computer system 100 may also be a subsystem of one of the above-listed systems. In some other embodiments, the computer system 100 may be an "off-the-shelf" generic computer system. In some embodiments, the computer system 100 may also be distributed amongst multiple systems. The computer system 100 may also be specifically dedicated to the implementation of the present technology. As a person in the art of the present technology may appreciate, multiple variations as to how the computer system 100 is implemented may be envisioned without departing from the scope of the present technology.

Those skilled in the art will appreciate that processor 110 is generally representative of a processing capability. In some embodiments, in place of or in addition to one or more conventional Central Processing Units (CPUs), one or more specialized processing cores may be provided. For example, one or more Graphic Processing Units 111 (GPUs), Tensor Processing Units (TPUs), and/or other so-called accelerated processors (or processing accelerators) may be provided in addition to or in place of one or more CPUs.

System memory will typically include random access memory 130, but is more generally intended to encompass any type of non-transitory system memory such as static random access memory (SRAM), dynamic random access memory (DRAM), synchronous DRAM (SDRAM), read-only memory (ROM), or a combination thereof. Solid-state drive 120 is shown as an example of a mass storage device, but more generally such mass storage may comprise any type of non-transitory storage device configured to store data, programs, and other information, and to make the data, programs, and other information accessible via a system bus 160. For example, mass storage may comprise one or more of a solid-state drive, hard disk drive, a magnetic disk drive, and/or an optical disk drive.

Communication between the various components of the computer system 100 may be enabled by a system bus 160 comprising one or more internal and/or external buses (e.g., a PCI bus, universal serial bus, IEEE 1394 "Firewire" bus, SCSI bus, Serial-ATA bus, ARINC bus, etc.), to which the various hardware components are electronically coupled.

The input/output interface 150 may provide networking capabilities such as wired or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, the networking interface may implement specific physical layer and data link layer standards such as Ethernet, Fibre Channel, Wi-Fi or any other radio data link protocol, Token Ring or Serial communication protocols. The specific physical layer and the data link layer may provide a base for a full network protocol stack, allowing communication among small groups of computers on the same local area network (LAN) and large-scale network communications through routable protocols, such as Internet Protocol (IP).

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown), a trackpad (not shown), a vocal Human-Machine Interface (HMI) (not shown) and/or any other device suitable for allowing the user to interact with the computer system 100 in addition to or instead of the touchscreen 190.

According to some implementations of the present technology, the solid-state drive 120 stores program instructions suitable for being loaded into the random-access memory 130 and executed by the processor 110 for executing acts of one or more methods described herein. For example, at least some of the program instructions may be part of a library or an application.

Figure 2:
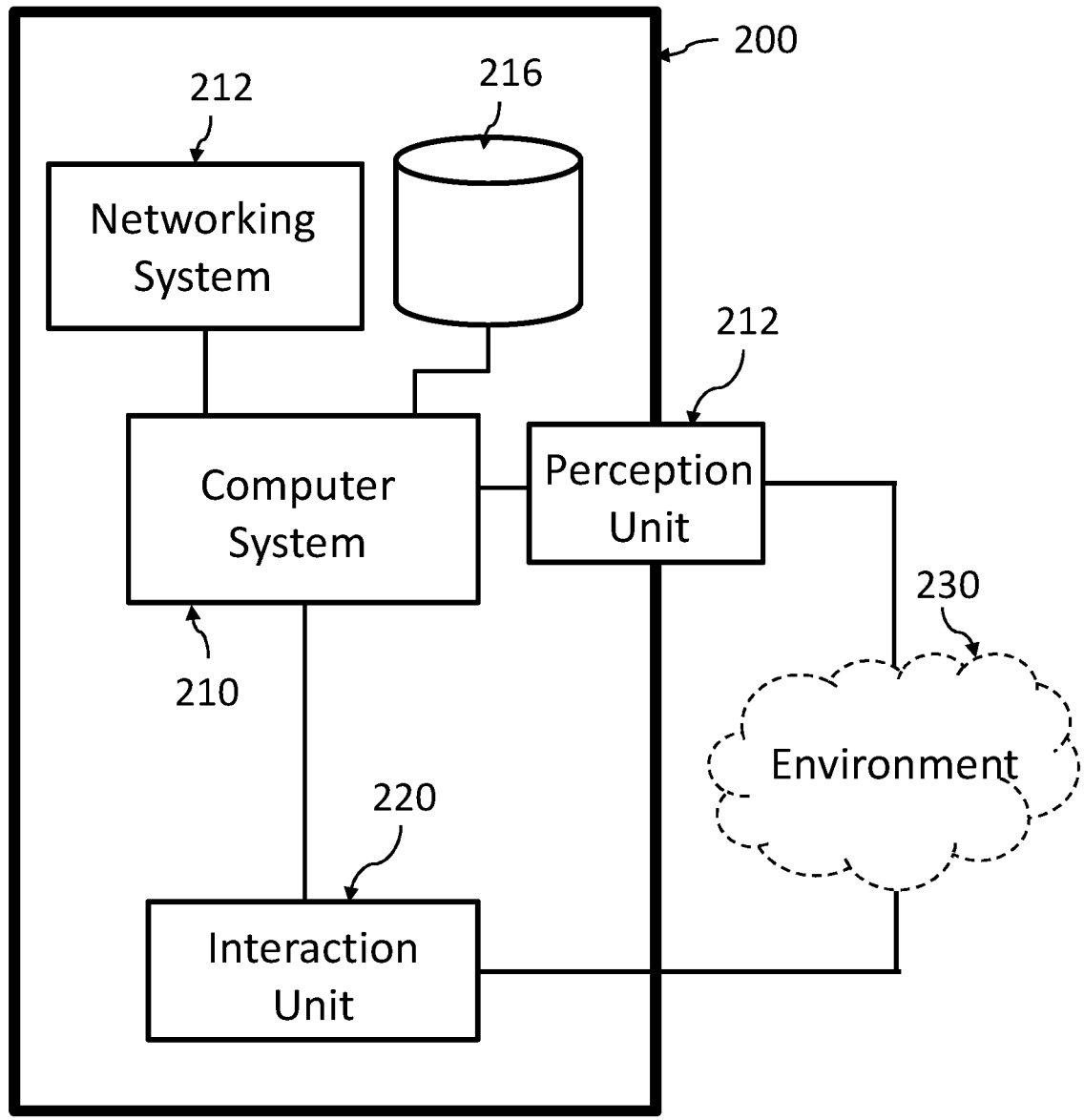
FIG. 2 is a high-level schematic diagram of an autonomous system in accordance with an embodiment of the present technology.

FIG. 2 illustrates a high-level schematic diagram of an autonomous system 200 in accordance with an embodiment of the present technology. The autonomous system 200 may comprise a computer system 210. The computer system 210 may be the computer system 100 and/or may include some or all of the components of the computer system 100. The computer system 210 may be internal or external with respect to the autonomous system 200. In one embodiment, the computer system 210 may be external and communicably connected to a plurality of autonomous systems 200 via a network (not shown).

The autonomous system 200 may operate within an environment 230 and may conduct assistive actions. The environment 230 may be without limitation a physical environment, such as a shopping center, an office or the like, or may be a logical environment, such as a computing device network, an electrical grid, or the like. The environment 230 may include entities such as, without limitation, shops, doors, corridor, people or any other entity whose features may be relevant to perform an assistive task in the case of a physical environment 230; and processors, networking devices, interfaces or any other entity whose features may be relevant to perform an assistive task in the case of a logical environment 230. Therefore, the entities and relations between the entities may be used to define the environment 230.

The autonomous system 200 is configured to capture raw data in the environment 230 via a perception unit 212. The perception unit 212 may comprise a Human-Machine interface, sensors such as cameras, LiDAR sensors or any type of sensing devices adapted for a physical environment 230, and may comprise ammeters, dataflow sensors, connexion indicators, or any type of sensors adapted for a logical environment 230. The raw data may be processed by the computer system 210 communicably connected to the perception unit 212. The perception unit 212 may be configured to execute signal processing and/or computer vision software applications to detect the occurrence of an event.

The computer system 210 may be configured to generate event descriptions of events occurring in the environment 230 and further identify abnormal events. In an embodiment, the computer system 210 may store event descriptions of the abnormal events in a database 216. In this embodiment or in yet a distinct embodiment, identifying a given event as "abnormal" is made by executing a coherence checking procedure between its corresponding event description and properties of the environment 230. Said coherence checking routines may comprise representing events under computer-readable format, accessing pre-defined common-sense rules and/or semantic knowledge of the environment 230 and further execute comparison of said event descriptions with common-sense rules and/or semantic knowledge using rule-based forward reasoning. If an event is found to be inconsistent with at least one common-sense rule or a semantic knowledge, said event may be identified as abnormal. Therefore, a list of abnormal events may be generated and updated with new abnormal events as events are detected by the perception unit 212. Other coherence checking procedures to identify an event as "abnormal" are contemplated in alternative embodiments.

In an embodiment, the database 216 may be embedded in the autonomous system 200 or located in an external physical location. The computer system 210 may be configured to access a content of the database 216 via a network (not shown) such as a Local Area Network (LAN) and/or a wireless connexion such as a Wireless Local Area Network (WLAN) or any non local network (WAN).

The database 216 may also comprise candidate objectives. The candidate objectives may be stored in another database (not shown) communicably connected to the autonomous system 200. One or more candidate objectives may be activated by the computer system 210 upon detection of corresponding abnormal events, thereby defining one or more corresponding "active objectives", or simply "objectives". The active objectives may be further executed and/or transmitted to an operator of the autonomous system 200 to address the corresponding abnormal event. Similarly, the active objectives may be stored in the database 216. Therefore, a list of active objectives may be generated and updated as new abnormal are detected and new active objective are defined based on said new abnormal events.

For instance, if a person identified as p1 is detected as lying on the ground, this event may be identified as abnormal. A candidate objective corresponding to a detection of a person lying on the ground may then be activated to help the person p1. In this situation, the candidate objective may be a function help( ), and the corresponding active objective may be the function associated with the parameter p1: help(p1).

Each candidate objective may comprise computer-readable instructions and may be described by an activation condition, or "selection condition", an identifier, an objective category (e.g. surveillance, assistance, guidance, advertisement, etc), parameters describing variable states such as location, time, object, person, etc, and a progressive task unit structure, or a combination thereof, in the following manner:

Objective(activation_condition, identifier, objective category, parameters, progressive task unit structure).

Progressive task unit structures are described in greater details hereinafter.

An activation condition of a candidate objective may correspond to one or more abnormal events. The activation condition is fulfilled if determination is made by the computer system 210 that the corresponding one or more abnormal events have been detected by the perception unit 212.

An active objective may be generated, or "derived", from a candidate objective by updating the parameters of the candidate objective with the parameters of the one or more abnormal events that caused the activation conditions of the corresponding candidate objective to be fulfilled. In other words, at least one parameter of the event descriptions that caused the selection of the candidate objective is transferred from the event descriptions to the candidate objective. As an example, a candidate objective is presented hereinbelow:

Objective(lying(p), id, help, {person}, progressive task unit structure)

If the person p1 is lying on the ground, then the previous candidate objective is activated, and the following active objective is generated:

Objective(lying(p1), id, help, p1, Assist progressive task unit structure), p1 being the parameter of the abnormal event.

The autonomous system 200 may comprise an interaction unit 220 configured to cause the autonomous system 200 to interact within the environment 230 by executing actions corresponding to the active objectives. The interaction unit 220 may operate interactive elements such as a human-machine interface, one or more screens, speakers, microphone, physical actuators, a driving system or any suitable system that may be used to interact within a physical environment if the environment 230 is a physical environment, or logical actuators, a processor, or any suitable system that may be used in a logical environment if the environment 230 is a logical environment.

In order to lighten the present disclosure, following examples relates to a physical environment 230. This is done merely to ease the reading of the present disclosure, and, again, not to define the scope or set forth the bounds of the present technology. The present technology and method described hereinafter may be independent from the autonomous system 200 and may be used in other fields of application. It should thus be noted that embodiments where the autonomous system 200 operate in a logical environment 230 are also contemplated. For example, the autonomous system 200 may operate to conduct assistive actions to assist a user of a software, a search engine or any other computer-implemented tool.

An aspect of the present technology is to provide a method for generating action strategies based on a list of objectives to be fulfilled. To that end, each candidate objective may comprise a progressive task unit structure. Progressive task unit structures may comprise series of actions, instructions and/or any other forms of indication of actions that may be performed to incrementally accomplish the task corresponding to its candidate objective. An illustrative embodiment of progressive task unit structures is described in greater details hereinafter.

Figure 3:
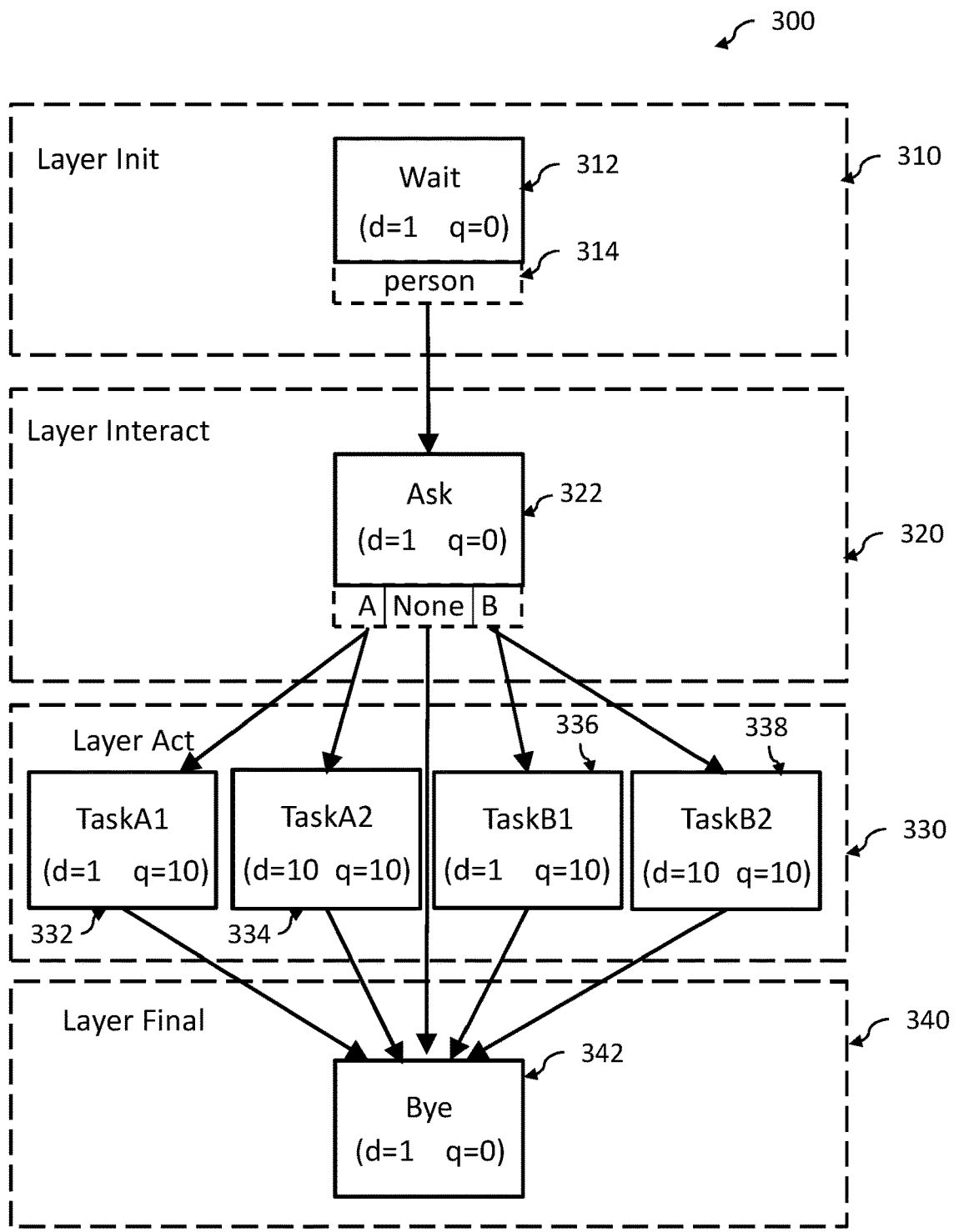
FIG. 3 is a high-level schematic of a progressive task unit structure in accordance with one embodiment of the present technology.

Turning now to FIG. 3, a high-level schematic of a progressive task unit structure 300 corresponding to an objective is illustrated in accordance with one embodiment of the present technology. Each progressive task unit structure describes tasks, or "actions", to be performed in order to accomplish the corresponding objective and comprises one or more executable modules for performing the tasks. In other words, the progressive task unit structure 300 may describe a hierarchy of actions, each action corresponding to an executable module of the progressive task unit structure 300. The executable modules are configured to be executed when the corresponding progressive task unit structure is executed. The computer system 210 may generate a corresponding optimal action strategy, or simply "action strategy", from a progressive task unit structure. The following description provide an illustrative representation of a progressive task unit structure.

A progressive task unit may be encoded in an Extensible Markup Language (XML) file and may comprise a sequence of processing levels $L=(l_0, l_1, \ldots, l_{|L|})$, a set of state variables $X=\{X_1, X_2, \ldots, X_{|X|}\}$, and a set of observable Boolean properties of the environment $O=\{o_1, o_2, \ldots, o_{|O|}\}$, where $|L|$, $|X|$, $|O|$ are finite, and $|L|$, $|X|$, $|O| \geq 0$. Each state variable $X_i$ can be assigned a value within a set of finite values, i.e., $Xi \in Hi=\{\bot, h_{1i}, \ldots, hi_{|Hi|}\}$, with Hi is finite, and $\bot$ denoting a special null value.

Each processing level $l_i$ may be composed of a set of executable modules, or simply "modules", $M_i=\{m^1_i, \ldots, m_i^{|Mi|}\}$ and may be associated to a set of active state variables, or "focalisation variables", $V_i \subset X$, the active state variables being a sub-set of the state variables X. Additionally or alternatively, each module may correspond to a distinct sub-set of state variables. We denote with $M=\cup_{i=1, \ldots, |M|} M_i$ the set of all the modules in all levels of a progressive task unit structure. Each module $m_i^j$ may be defined by a non-empty set of options $\{\alpha_i^j, \beta_i^j, \ldots, \chi_i^j\}$, representing possible outcomes of its execution. The symbols used to denote an option (e.g., $\alpha_i^j$,) may be set as unique identifiers in all the progressive task unit structures. Each option may be associated with one or more of the following attributes:

an execution condition $\alpha_i^j \cdot \psi$: a specific configuration of the observable Boolean properties of the environment 130 in O. The configuration represents an observable condition used at execution time to determine that the corresponding outcome has occurred. If the execution condition is satisfied, one or more corresponding successor executable modules may be executed. In other word, the execution condition may correspond to events detected by the perception unit 212 indicative of an outcome of the execution of a previous module. The execution conditions corresponding to the options of a given executable module may be mutually exclusive.

a probability $\alpha_i^j \cdot p$: a probability of occurrence of the corresponding outcome, or "execution probability" of the corresponding executable module; the sum of all the probability values for all the options in a module being equal to 1. The probabilities of occurrence differentiate the present technology from standard planning techniques as they may be learned by the autonomous system 200 during operation, using, for instance, MLA techniques. Indeed, standard planning techniques may consider that an execution of one action may only have one outcome. As an example, in standard planning technique, if the autonomous system is to open a door, a corresponding outcome of this action at planning time is that the door will be open. However, this do not take the probability that the door may be locked or broken, into account. The computer system 210 may establish the probabilities of occurrence of the outcomes based on experiences during operation of the autonomous system and/or using MLA techniques.

- a execution score, or "quality", $\alpha_i^j \cdot q$: an estimated score for achieving this outcome. The execution score may be a constant value or a function of state variables X. It may be used to generate the action strategy to indicate which executable modules should be preferentially executed to perform the corresponding task.
- a duration $\alpha_i^j \cdot d$: an estimated time for achieving this outcome. In one embodiment, d is representative of an estimated amount of a specific resource for performing the actions. For instance, d may be representative of a memory size needed to perform the action, or an estimated amount of battery of the autonomous system 200 needed to perform the action. The duration may be expressed either as a constant value or as a function of state variables.
- one or more successor executable modules $\alpha_i^j \cdot SM$: a set of successor executable modules that are enabled after the corresponding outcome. In the same or another embodiment, successor executable modules are either at the same level or at a following level with respect to the current one.
- one or more state variable updates $\alpha_i^j \cdot SVU$: a set of state variable assignments that must be considered after this outcome, the state variables corresponding to a description of a state of the autonomous system 200. Upon determination that the corresponding outcome occurred, one or more state variable may be updated: $(X_k \leftarrow h'_k) \in \alpha_i^j \cdot SVU$, with $Xi \in V_i$ considering that only state variables corresponding to the current level may be updated, and $h'_i \in H_i$.

As it will be explained in greater details, the computer system 210 may thus accomplish a task incrementally, one processing level after the other, to adapt a depth of an accomplishment according to resources available to the autonomous system 200.

The progressive task unit structure 300 may correspond to an objective to be fulfilled by causing the autonomous system 200 to interact with a user. Therefore, the progressive task unit structure 300 may comprise actions to be performed for waiting a user and interacting with said user.

In this illustrative progressive task unit structure 300, the autonomous system 200 may execute two activities A and B upon request of the user. However, the user may not be aware of these abilities. The autonomous system 200 may be initially in a waiting state. Whenever a user is detected in front of the robot, the autonomous system 200 may start an interaction with the user to describe the activities A and B that it may perform. The user may then select one of them or answer that she/he is not interested. If an activity is selected, the autonomous system 200 executes a task for performing it. Each activity may be performed by executions of two alternatives tasks TaskA1 and TaskA2 for activity A and TaskB1 and TaskB2 for activity B. After the execution of the task, the autonomous system 200 may return to the wait state, waiting for a next user.

Figure 4:
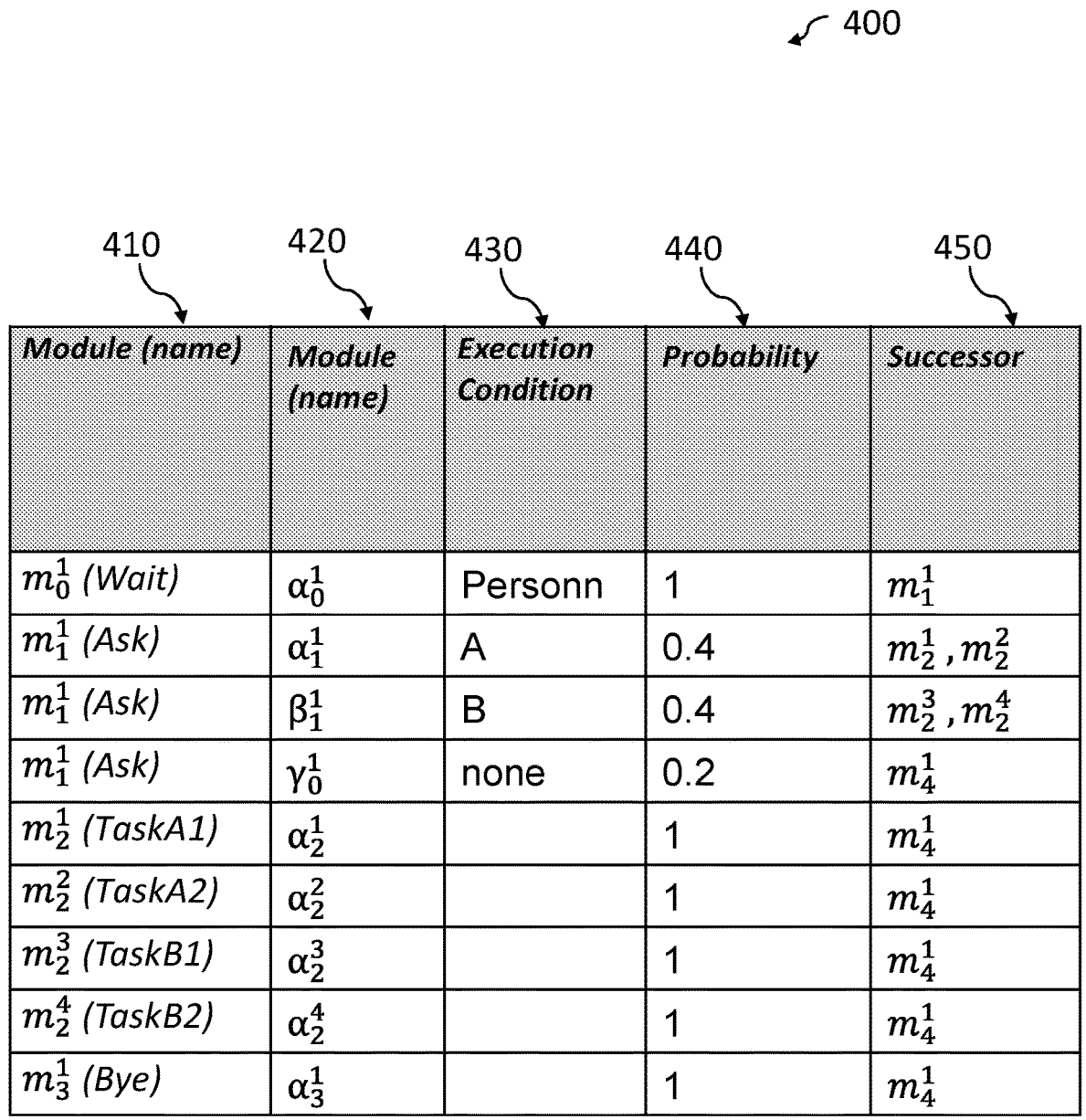
FIG. 4 is a descriptive table of a progressive task unit structure in accordance with one embodiment of the present technology.

The illustrative progressive task unit structure 300 comprises three processing levels: an initial layer 310 comprising executable module 312, an interaction layer 320 comprising executable module 322, an action layer 330 comprising executable modules 332, 334, 336 and 338, and a final layer 340 comprising an executable module 342. In this illustrative example, X is empty and O={person; A; B; none}. Specific values for duration (d representative of a time resource) and quality (q) are indicated on FIG. 3 in the corresponding executable modules, while probability of the outcomes and the list of executable modules M is illustrated in FIG. 4. A structure of the progressive task unit structure 300 enables the autonomous system 200 to "progressively" conduct an assistive task. Indeed, definition of the executable modules and continuous consideration of the state variables are such that the execution of the assistive task may be interrupted and further resumed. The autonomous system 200 does not necessarily have to start the assistive task from scratch in the event of an interruption.

During the interaction with the user, the following inconveniences may occur: the user does not complete the interaction by not answering to the autonomous system 200 for instance, any action may fail for reasons not defined in the progressive task unit structure 300, and/or any action may be aborted according to some external commands and/or conditions.

To provide robustness to the present technology, each executable module may be associated with a predetermined configuration of a subset of the state variable X. For instance, a first executable module corresponding to an illustrative action of taking a picture with a camera may be associated with the following configuration of state variables:

{camera: ON, battery: HIGH}, the state variables being the camera state, "camera", and a level of battery, "battery", of the autonomous system 200.

The action corresponding to the first executable module may be identified as a failure, or a "failure state" of the autonomous system 200, if determination is made that the configuration of said first executable module is not fulfilled. For instance, if the camera is off and/or the battery is low, the autonomous system may be declared in a failure state. The progressive task unit structure may comprise failure recovery modules configured to be executed when the autonomous system 200 is declared in a failure state. As it will be explained in greater details hereinafter, failure recovery module represents resource-bounded action that may be executed by the computer system 210 when determination is made that the autonomous system 200 failed to perform an action corresponding to an executable module to pursue an accomplishment of a corresponding task with limited resources. In other words, a failure recovery module may be executed when determination is made that state variables, or sub-set of state variables, have one or more specific combinations of values.

The failure recovery modules may correspond to one or more configurations of state variables. A failure recovery module may therefore encompass different failure situations and be executed to recover from said situations.

Referring back to the previous example, if the first executable module is to be executed and the configuration of state variables is {camera: OFF, battery: HIGH}, then the autonomous system may not capture an image with the camera. A failure recovery module corresponding to the configuration of state variable {camera: OFF, battery: HIGH or LOW} may be comprised in the progressive task unit structure to cause the autonomous system to go to a repair station for instance. Possible failures of actions may be therefore anticipated prior execution of action strategies by indicating a resource bounded action to be performed in case of failure, with failure recovery modules.

The progressive task unit structure described herein encompasses a formalism to describe a task. In this embodiment, a progressive task unit structure is formalized as a hierarchy representing different ways to accomplish a corresponding task such that an ability to adapt a depth and a refinement of a task accomplishment according to available resources is provided. The skilled person would understand that the present technology may describe a unified planning language and that Hierarchical Task Networks (HTN), Dynamic Bayes Networks (DBN), and Algebraic Decision Diagrams (ADB) may be retrieved and/or derived from a progressive task unit structure.

FIG. 4 is a descriptive table 400 of a progressive task unit structure in accordance with one embodiment of the present technology. The descriptive table 400 comprises a list 410 of the name of the executable modules of the progressive task unit structure 300 in combination with their respective options 420. Each combination of executable and option is associated with its corresponding execution condition in column 430, its corresponding probability in column 440 and its successor executable modules in column 450 of the descriptive table 400.

For instance, the executable module 322 of the progressive task unit structure 300, namely executable module $m_1^1$ in the descriptive table 400, comprises three options: $\alpha_1^1$ corresponding to the outcome where the user selected the activity A, $\beta_1^1$ corresponding to the outcome where the user selected the activity B, and $\gamma_1^1$ corresponding to the outcome where the user selected neither of them.

The progressive task unit structures may be represented as a tree structure illustrated on FIG. 3, as a description table as illustrated on FIG. 4, or as any other suitable manner with equivalent features. The illustration of FIG. 3 and FIG. 4 are set as an aid to understanding and not to set forth the bounds of the present technology. This aspect is not limitative.

The computer system 210 may comprise a planning module configured to derive an action strategy from a progressive task unit structure such as the progressive task unit structure 300, an execution of the action strategy resulting in accomplishing the active objective corresponding to said progressive task unit structure. Therefore, the executable action strategy depends on the progressive task unit structures and the state variables of the autonomous system 200. In one embodiment, the planning module may be configured to generate one action strategy for each candidate objective received by the computer system 210.

In one embodiment, the planning module may merge a plurality of action strategies corresponding to a plurality of active objectives into one global action strategies by merging the progressive unit structures of the objectives and generating an executable action strategy based on the merging of the progressive unit structures. Merging the progressive unit structures may be made by concatenating their respective description table 500.

In the same or another embodiment, the planning module uses stochastic decision processes to generate the executable action strategy, formalized as a factored Markov decision process (MDP). An MDP is a discrete-time stochastic control process. It consists of a mathematical framework configured for modeling decision making in situations where outcomes may be partly uncertain and partly under the control of a decision maker, namely a user. As persons skilled in the art would understand, various implementations of a process to compute optimal policy based on the progressive task unit structures may be possible while nonetheless remaining within the scope of the present technology.

Figure 5:
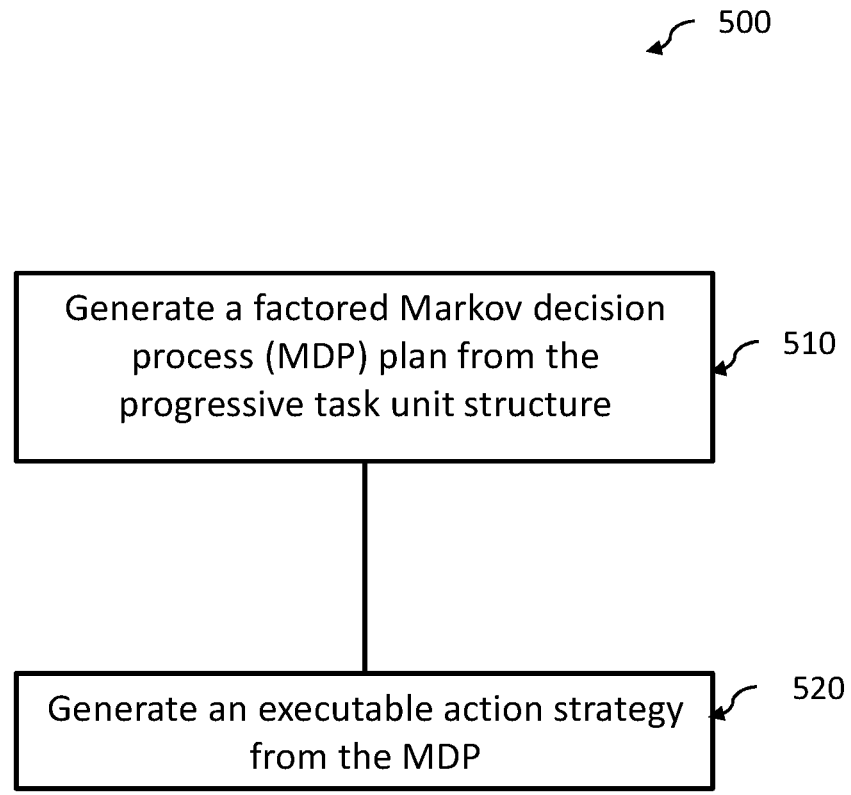
FIG. 5 is a sequence diagram showing operations of a method for generating an action strategy in accordance with one embodiment of the present technology.

FIG. 5 is a sequence diagram showing operation of a method for executing a progressive task unit structure to generate an action strategy in accordance with one embodiment of the present technology. The planning module may be configured to execute the operations illustrated in FIG. 6. An MDP is generated based on the progressive task unit structure at step 510, the generation of the MDP being described hereinbelow.

Given a progressive task unit structure as described hereinabove, the planning module is configured to generate an MDP. An MDP is defined as (S; A; T; R), with S is a finite set of states of the autonomous system 200, A is a finite set of actions, T (s; $a_c$; $s_f$) a transition function denoting the probability for going from state s to state $s_f$ using action $a_c$, and R (s; $a_c$; $s_f$) a reward function expressing an expected gain for using action $a_c$ in state s and arriving in state $s_f$. The reward function may be based on the execution score of a corresponding executable module.

An MDP may be defined based on a progressive task unit structure as described in A practical framework for robust decision-theoretic planning and execution for service robots (L. Iocchi et al., 2016), a content of which being incorporated by reference. Formally, an output of the planning module at operation 510 may be a MDP=$\langle s_0^0; G; \{\} s_i^j; m_i^j; SS_i^j \} \rangle$, where $s_0^0$ is the initial state, G is a set of final states, and in each tuple $\langle s_i^j, m_i^j, SS_i^j \rangle$, $s_i^j$ is a state defined by $s_i^j=[\alpha_i^j, X_1, \ldots, X_{|X|}]$, $m_i^j$ is the action to be executed in this state and corresponding to an executable module in the progressive task unit structure, $SS_i^j$ is a set of pairs ($s_i^k$, $\alpha_i^k \cdot \omega$), with $s_i^k$ being a successor state and $\alpha_i^k \cdot \psi$ is the execution condition declared in the progressive task unit structure and associated to the corresponding outcome.

The planning module is further configured to define an executable action strategy based on the MDP at operation 520. The planning module may be configured to determine a global execution score, the global execution score being a combination of the execution scores associated with the executable modules corresponding to the states of the MDP. In this embodiment, the execution scores are weighted by the execution probabilities of the respective executable modules. In the same or another embodiment, the executable action strategy is defined by solving a Bellman equation given as follows:

$$V(s)=\text{MAX}_{\{m \in A\}}[R(s)+\Sigma \lambda T(s,a,s') \cdot V(s')]$$

V is an expected value function representing the expected gain in acting with an action $a_c$ at state s and R and T are respectively the reward and transition functions.

Classical algorithms such as Value Iteration [Richard Bellman. A markovian decision process. Indiana Univ. Math. J.] or Policy Iteration [R. A. Howard. Dynamic Programming and Markov Processes] are configured to compute an optimal action strategy, or "optimal policy" efficiently.

Figure 6:
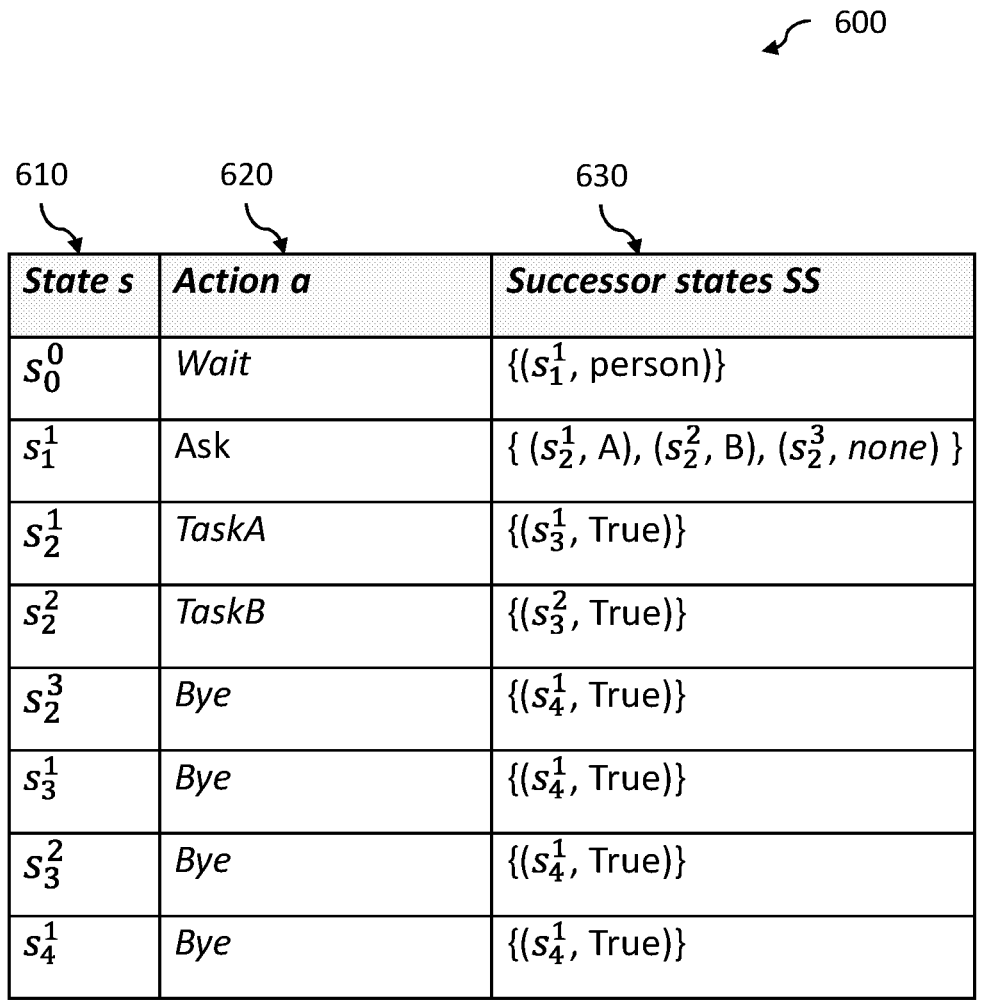
FIG. 6 is a representation of an action strategy in accordance with an embodiment of the present technology.

FIG. 6 is representation of an action strategy 600 in accordance with one embodiment of the present technology. The action strategy 600 corresponds to the illustrative progressive task unit structure 300. The state $s_0^0$ being the initial state and G=$\{s_4^1\}$ the set of goal states. The representation 600 comprises the states 610 of the MDP, their corresponding actions 620 and their corresponding sets $SS_i^j$ described hereinbefore 630.

As described hereinbefore, the failure recovery modules of a progressive task unit structure may define failure states of the autonomous system 200. FIG. 7 is a representation of an action strategy 700 in accordance with one embodiment of the present technology. A first portion 710 of the action strategy comprises states corresponding to executables modules of the progressive task unit, or "safe" states, and a second portion 720 of the action strategy comprises failure states corresponding to failure recovery modules of the progressive task unit, referred to as "unsafe states", or "failure states". In one embodiment, the first portion 710 and the second portion 720 may correspond to two different action strategies and/or two different progressive task unit structures that may be independently executed. Separating the safe states from the failure states helps to reduce the set of state variables during execution of the action strategy and increase the scalability of the present technology.

Failure recovery modules may correspond either to resource-bounded actions to be performed by the autonomous system 200 or to distinct progressive task unit structure, or "failure recovery progressive task unit structure". In other words, if determination is made that the autonomous system 200 is in an unsafe state corresponding to a failure recovery module of a first progressive task unit structure, a second progressive task unit structure (e.g. failure recovery progressive task unit structure) may be executed. The second progressive task unit structure may comprise a hierarchy of resource-bounded actions to be performed to recover from the failure corresponding to the unsafe state of the autonomous system. A second action strategy may be generated from the second progressive task unit structure and further executed in a similar fashion to what is described hereinbefore. It can be said that failure recovery modules corresponding to resource-bounded actions to be performed by the autonomous system 200 are representative of "partial failure states" of the autonomous system 200, and that failure recovery modules that cause execution, by the computer system 210, of failure recovery progressive task unit structure are representative of "total failure states" of the autonomous system 200.

In the illustrative example of FIG. 6, the autonomous system is configured to endlessly repeat the action "Bye" which may be an undesirable behavior, or a "failure state". In FIG. 7, a state variable ByeCounter has been added to the corresponding progressive task unit structure to cause the system to transit to a failure state $f_1$ when the execution condition $\alpha_3^1 \cdot \psi$ (ByeCounter=3) is true. Therefore, a specific action may be performed by the autonomous system 200 when determination is made by the planning module that the execution condition $\alpha_3^1 \cdot \psi$ is true. As a result, the autonomous system 200 is able, based on the structure of the progressive task unit structure and the recovery failure modules, to build an action strategy that takes into account execution uncertainty, limited resources to execute actions and possible execution failures thus allowing a robust behavior strategy of the autonomous systems 200.

Figure 8:
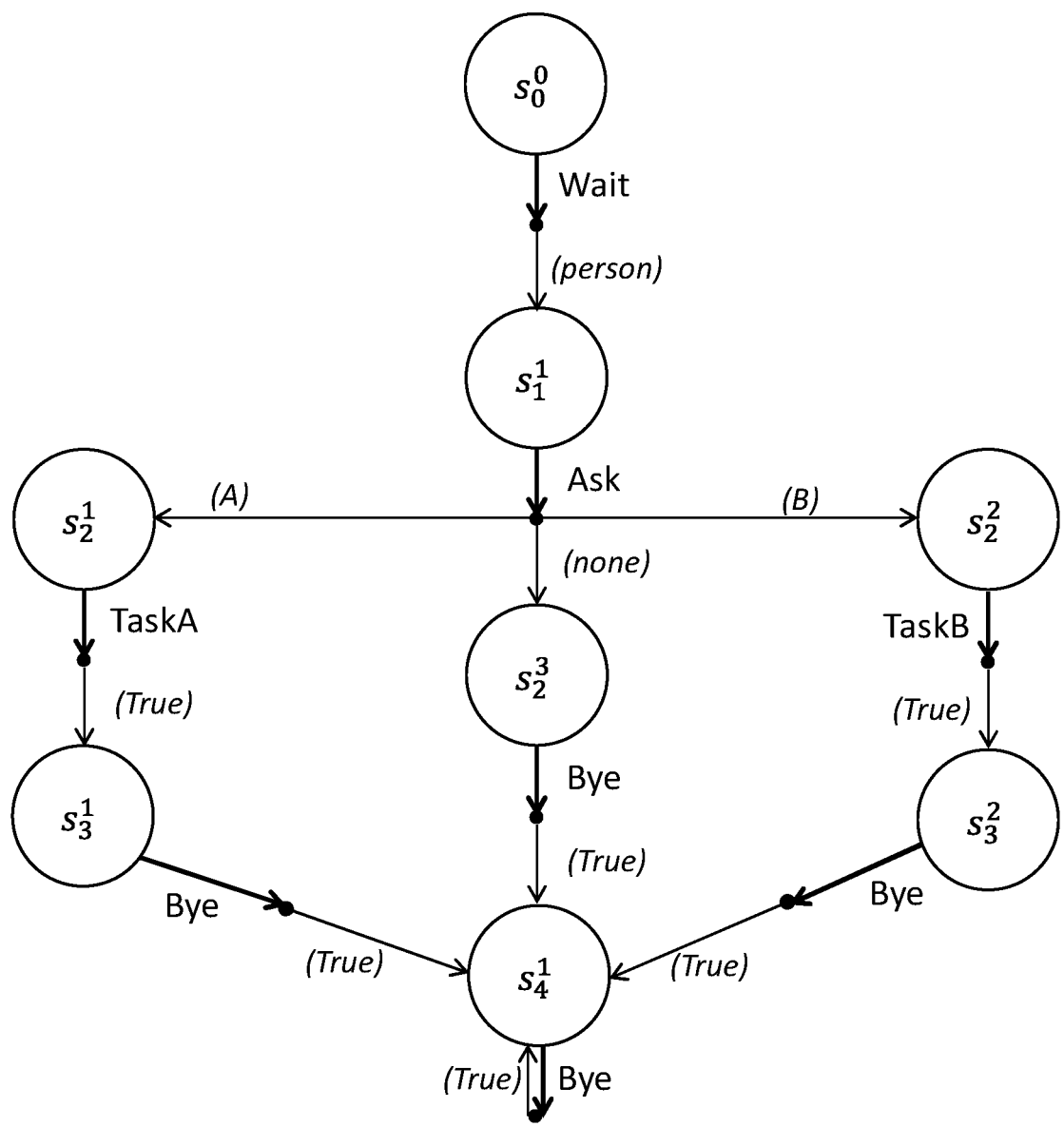
FIG. 8 is a finite-state machine of an action strategy in accordance with one embodiment of the present technology.

FIG. 8 is finite-state machine of the action strategy 600 in accordance with one embodiment of the present technology. In this illustrative embodiment, the executable action strategy 600 is represented as an automaton with nodes representing the state $s_i^j$ of the autonomous system 200 and transition representing the execution of the executable action strategy actions $m_i^j$. In one embodiment, the action strategy may be configured to have a finite horizon, namely a maximal number of actions is set by the computer system 210, or an infinite horizon, namely an unlimited number of actions. The illustrative example of FIG. 6 and FIG. 8 illustrates an action strategy with an infinite horizon as the successor executable module of the final state is the final state itself. An infinite horizon is a configuration wherein the autonomous system 200 never completely ends an execution of the action strategy by transiting from one state to others infinitely as depicted in FIG. 8.

Using the sub-sets of state variables corresponding to the executable modules may facilitate a generation of an action strategy. Indeed, the computer system may select executable modules that correspond to a sub-set of state variables in the corresponding progressive task unit structure and generate the action strategy based only on those executable modules. For instance, while searching for a person by the autonomous system 200 (e.g. during execution of an action strategy based on an objective indicating that said person is to be searched), if determination is made that the battery is LOW, the computer system 210 may consider only nodes of said action strategy that correspond to executable modules comprising the state variable: battery: LOW. Indeed, in this situation, the autonomous system 200 may not be able to perform actions requiring a high level of battery. For this reason, the sub-sets of state variables may be called "focalisation variables" as other state variables may not be considered at execution time. For example, use of the focalisation variables of the executable modules reduces an action strategy from 500.000 nodes to 100.000 nodes.

Upon definition of the action strategy by, for instance, defining the semantic map of FIG. 8, the planning module is configured to further transmit the executable action strategy to the execution module. The execution module is configured to execute the action strategy via the interaction unit 220. In the same or another embodiment, the execution module may be communicably connected to the perception unit 212 to determine the state variables $X = \{X_1, X_2, \ldots, X_{|X|}\}$, and thereby a current state $s_i^j$ of the autonomous system 200. The interaction unit 220 operates physical and/or logical actuators, mechanisms, devices or any element that is configured to cause the autonomous system 200 to interact with the environment 230.

The execution module may be configured to execute the executable action strategy by browsing the action strategy from the initial state. The list of successor states of each state of the MDP may be generated according to the progressive task unit structure as described hereinabove and may be comprised in the action strategy. Thus, execution conditions $\alpha_i^k \cdot \psi$ over observable environment properties of the environment 230 may be assessed by the perception unit 212 during execution of the action strategy. Upon determining in which first state $s_i^j$ the autonomous system 200 is, the execution module may be configured to perform the corresponding action $m_i^j$. Once this action has been performed, the execution module may be configured to determine a new state $s_i^j$ of the autonomous system 200, using the perception unit 212 for instance, among the successor states of the first state $s_i^j$.

Upon determining that the autonomous system is in a final state comprised in G, the execution module is configured to terminate the execution of the plan and return a first signal to the computer system 210 indicating that execution of the action strategy is complete.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method for generating an action strategy to be executed by an autonomous system, the action strategy comprising a series of actions to be performed by the autonomous system to accomplish a corresponding active objective, the series of actions comprising one or more resource-bounded actions to be performed by the autonomous system if the autonomous system has limited resources to accomplish the active objective, the autonomous system comprising one or more sensing devices configured to sense state variables, the state variables defining a state of the autonomous system, the method comprising:

accessing a first database populated with event descriptions corresponding to events detected by the autonomous system, the events occurring or having occurred in an environment where the autonomous system is configured to operate;

accessing a second database populated with candidate objectives, each candidate objective defining a task accomplishable by the autonomous system and comprising:

an activation condition corresponding to one or more event descriptions, the activation condition being fulfilled if determination is made that the corresponding one or more event descriptions are found in the first database; and a progressive task unit structure describing a hierarchy of actions to be performed in order to accomplish the corresponding candidate objective, the progressive task unit structure comprising executable modules configured to be executed by the autonomous system, each executable module corresponding to an action of the hierarchy of actions and being associated with a given state of the autonomous system, at least one progressive task unit structure comprising at least one failure recovery module corresponding to a resource-bounded action to be performed in response to a given failure state of the autonomous system being detected by the one or more sensing devices while performing an action strategy, the executable modules and failure recovery modules being associated with a execution score indicative of which modules should be preferentially executed during performance of the action strategy;

selecting one or more candidate objectives from the second database by determining whether the activation conditions of the one or more candidate objectives are fulfilled based on the event descriptions; and executing the selected one or more candidate objectives, an execution of a candidate objective comprising:

transferring parameters of at least one of the event descriptions that caused the selection of the candidate objective to the selected candidate objective, thereby generating the active objective;

generating an action strategy from the progressive task unit structure, the action strategy comprising information about actions to be performed according to a state of the autonomous system such that, upon detection of a failure state of the autonomous system, a corresponding resource bounded-action is executed, the series of actions of the action strategy being based on the execution scores of the executable modules and failure recovery modules; and executing the series of actions of the action strategy based on the state of the autonomous system.

2. The method of claim 1, wherein event descriptions of the first database correspond to abnormal events detected by the autonomous system, each of the abnormal events being identified as incoherent based on a result of a coherence checking procedure between an event description of the corresponding event and properties of the environment, and wherein accessing the first database is made in response to detecting, by the autonomous system, an abnormal event.

3. The method of claim 1, wherein the progressive task unit structures further comprise:

one or more sequence of processing levels, each sequence of processing levels comprising one or more of the executable modules;

a set of state variables describing parameters of a state of an execution of the candidate objective;

a set of observable properties, an observable property corresponding to one or more of the event descriptions of the first database;

or a combination thereof.

4. The method of claim 3, wherein each executable module of the progressive task unit structures corresponds to configuration of a sub-set of state variables of the set of state variables of the corresponding progressive task unit structure, and, if determination is made that, for a given executable module, a corresponding configuration is not fulfilled upon execution of the action corresponding to the given executable module, said action is identified as a failure of the autonomous system.

5. The method of claim 1, wherein the at least one of the candidate objective further comprises one or more failure recovery progressive task unit structures comprising a hierarchy of resource-bounded actions to be performed, each failure recovery progressive task unit structure corresponding to a failure recovery module of a progressive task unit structure, execution of the failure recovery module causing an execution of the resource-bounded actions of the failure recovery progressive task unit structure by the autonomous system.

6. The method of claim 1, wherein the executable modules are further associated with an execution score for executing corresponding executable modules, and generating the executable action strategy comprises maximizing a global execution score, the global execution score being a combination of the execution scores associated with the executable modules.

7. The method of claim 6, wherein the execution scores of the executable modules are weighted by execution probabilities of the corresponding executable modules for determining the global execution score, an execution probability describing a probability of an execution of the corresponding executable module by the autonomous system.

8. The method of claim 1, wherein generating the action strategy from the progressive task unit structure of the candidate objective comprises:

generating a stochastic decision process from the progressive task unit structure, the stochastic decision process comprising at least:
- a set of actions corresponding to the actions of the executable modules of the progressive task unit structure; and
- a set of states comprising states of the autonomous system, each state corresponding to an outcome of an execution of an executable module;

and executing the stochastic decision process.

9. The method of claim 8, wherein the stochastic decision process is a factored Markov decision process.

10. The method of claim 1, wherein one or more actions corresponding to the executable modules cause an execution of one or more candidate objectives.

11. A non-transitory computer readable storage medium comprising instructions which, upon execution of the instructions by a processor, cause a computer to carry out the steps of the method of claim 1.

12. A system for generating an action strategy to be executed by an autonomous system, the system comprising a processor and a memory configured to store instructions which, upon being executed by the processor, cause the processor to:
- access a first database populated with event descriptions corresponding to events detected by the autonomous system, the events occurring or having occurred in an environment where the autonomous system is configured to operate;
- access a second database populated with candidate objectives, each candidate objective defining a task accomplishable by the autonomous system and comprising:
  - an activation condition corresponding to one or more event descriptions, the activation condition being fulfilled if determination is made that the corresponding one or more event descriptions are found in the first database; and
  - a progressive task unit structure describing a hierarchy of actions to be performed in order to accomplish the corresponding candidate objective, the progressive task unit structure comprising executable modules configured to be executed by the autonomous system, each executable module corresponding to an action of the hierarchy of actions and being associated with a given state of the autonomous system, at least one progressive task unit structure comprising at least one failure recovery module corresponding to a resource-bounded action to be performed in response to a given failure state of the autonomous system being detected by one or more sensing devices while performing an action strategy, the executable modules and failure recovery modules being associated with a execution score indicative of which modules should be preferentially executed during performance of the action strategy;
- select one or more candidate objectives from the second database by determining whether the activation conditions of the one or more candidate objectives are fulfilled based on the event descriptions; and
- execute the selected one or more candidate objectives, an execution of a candidate objective comprising:
  - transferring parameters of at least one of the event descriptions that caused the selection of the candidate objective to the selected candidate objective, thereby generating an active objective;
  - generating an action strategy from the progressive task unit structure, the action strategy comprising a series of actions to be performed by the autonomous system to accomplish a corresponding active objective, the series of actions comprising one or more resource-bounded actions to be performed by the autonomous system if the autonomous system has limited resources to accomplish the active objective, the action strategy comprising information about actions to be performed according to a state of the autonomous system such that, upon detection of a failure state of the autonomous system, a corresponding resource bounded-action is executed, the series of actions of the action strategy being based on the execution scores of the executable modules and failure recovery modules; and
  - executing the series of actions of the action strategy based on the state of the autonomous system.

13. The system of claim 12, wherein event descriptions of the first database correspond to abnormal events detected by the autonomous system, each of the abnormal events being identified as incoherent based on a result of a coherence checking procedure between an event description of the corresponding event and properties of the environment, and wherein accessing the first database is made in response to detecting, by the autonomous system, an abnormal event.

14. The system of claim 12, wherein the progressive task unit structures further comprise:
- one or more sequence of processing levels, each sequence of processing levels comprising one or more of the executable modules;
- a set of state variables describing parameters of a state of an execution of the candidate objective, the autonomous system comprising one or more sensing devices configured to sense state variables, the state variables defining a state of the autonomous system;
- a set of observable properties, an observable property corresponding to one or more of the event descriptions of the first database;
- or a combination thereof.

15. The system of claim 14, wherein each executable module of the progressive task unit structures corresponds to configuration of a sub-set of state variables of the set of state variables of the corresponding progressive task unit structure, and, if determination is made that, for a given executable module, a corresponding configuration is not fulfilled upon execution of the action corresponding to the given executable module, said action is identified as a failure of the autonomous system.

16. The system of claim 12, wherein the at least one of the candidate objective further comprises one or more failure recovery progressive task unit structures comprising a hierarchy of resource-bounded actions to be performed, each failure recovery progressive task unit structure corresponding to a failure recovery module of a progressive task unit structure, execution of the failure recovery module causing an execution of the resource-bounded actions of the failure recovery progressive task unit structure by the autonomous system.

17. The system of claim 12, wherein the executable modules are further associated with an execution score for executing corresponding executable modules, and generating the executable action strategy comprises maximizing a global execution score, the global execution score being a combination of the execution scores associated with the executable modules.

18. The system of claim 17, wherein the execution scores of the executable modules are weighted by execution probabilities of the corresponding executable modules for determining the global execution score, an execution probability describing a probability of an execution of the corresponding executable module by the autonomous system.

19. The system of claim 12, wherein the processor is further configured to generate the action strategy from the progressive task unit structure of the candidate objective by:
   generating a stochastic decision process from the progressive task unit structure, the stochastic decision process comprising at least:
      a set of actions corresponding to the actions of the executable modules of the progressive task unit structure; and
      a set of states comprising states of the autonomous system, each state corresponding to an outcome of an execution of an executable module;
   and
   executing the stochastic decision process.

20. The system of claim 19, wherein the stochastic decision process is a factored Markov decision process.

* * * * *